United States Patent
Ibrahim

(10) Patent No.: US 8,892,347 B1
(45) Date of Patent: Nov. 18, 2014

(54) SYSTEM AND METHOD FOR NODE ADAPTIVE FILTERING AND CONGESTION CONTROL FOR SAFETY AND MOBILITY APPLICATIONS TOWARD AUTOMATED VEHICLES SYSTEM

(71) Applicant: Faroog Ibrahim, Dearborn Heights, MI (US)

(72) Inventor: Faroog Ibrahim, Dearborn Heights, MI (US)

(73) Assignee: Savari, Inc., Santa Clara, CA (US)

( * ) Notice: Subject to any disclaimer, the term of this patent is extended or adjusted under 35 U.S.C. 154(b) by 45 days.

(21) Appl. No.: 13/907,862

(22) Filed: Jun. 1, 2013

(51) Int. Cl.
*G05D 1/02* (2006.01)
*G08G 1/00* (2006.01)

(52) U.S. Cl.
CPC .......................................... *G08G 1/00* (2013.01)
USPC .......................................................... 701/300

(58) Field of Classification Search
USPC .......................... 701/117, 409, 412, 414, 300
See application file for complete search history.

(56) References Cited

U.S. PATENT DOCUMENTS

| | | | |
|---|---|---|---|
| 2008/0042876 A1* | 2/2008 | Bauer et al. | 340/905 |
| 2012/0089319 A1* | 4/2012 | Basnayake | 701/300 |

* cited by examiner

*Primary Examiner* — Kim T Nguyen
(74) *Attorney, Agent, or Firm* — MaxValueIP LLC

(57) ABSTRACT

In one example, we describe a method and infrastructure for DSRC V2X (vehicle to infrastructure plus vehicle) system. This can cover a communication circle up to 800 m, and in some cases 1000 m, and as a result, in congested traffic areas, the onboard unit is communicating with high number of units and may end up saturating its processing capability very quickly. In one example, the task is to provide different levels of node filtering algorithms to intelligently select the node data to be processed. This results in optimally using the available processing power by only processing the data of the desired nodes. This method is based on combination of range, velocity, heading, direction, transmitted power, received power threshold, and map database, if available. This also reduces the V2X communication congestion problem resulted in high number of one-to-many nodes communication.

21 Claims, 17 Drawing Sheets

SYSTEM AND METHOD FOR NODE ADAPTIVE FILTERING AND CONGESTION CONTROL FOR SAFETY AND MOBILITY APPLICATIONS TOWARD AUTOMATED VEHICLES SYSTEM

BACKGROUND OF THE INVENTION

One aspect of the present invention relates to a system that uses the Vehicle to Vehicle (V2V) and/or the Vehicle to infrastructure communication for safety and mobility applications. The invention provides methods and systems to make the V2X realized and effectively used in any intelligent transportation system toward automated vehicle system. One objective of this invention is to provide different levels of node filtering algorithms to intelligently select the node data to be processed.

Dedicated Short Range Communication (DSRC) is the main enabling technology for connected vehicle applications that will reduce vehicle crashes through fully connected transportation system with integrated wireless devices and road infrastructure. In such connected system, data among vehicles and with road infrastructure will be exchanged with acceptable time delay. DSRC is the enabler for the V2X communication and provides 360 degrees field of view with long range detection/communication capability up to 1000 meter. Data such as vehicle position, dynamics and signals can be exchanged among vehicles and road side equipments which make the deployment of safety applications such as crash avoidance systems (warning and control) possible. V2X technology will complement and get fused with the current production crash avoidance technologies that use radar and vision sensing. V2V will give drivers information needed for safer driving (driver makes safe decisions) on the road that radar and vision systems cannot provide. This V2X capability, therefore, offers enhancements to the current production crash avoidance systems, and also enables addressing more complex crash scenarios, such as those occurring at intersections. This kind of integration between the current production crash avoidance systems, V2X technology, and other transportation infrastructure paves the way for realizing automated vehicles system.

The safety, health, and cost of accidents (on both humans and properties) are major concerns for all citizens, local and Federal governments, cities, insurance companies (both for vehicles and humans), health organizations, and the Congress (especially due to the budget cuts, in every level). People inherently make a lot of mistakes during driving (and cause accidents), due to the lack of sleep, various distractions, talking to others in the vehicle, fast driving, long driving, heavy traffic, rain, snow, fog, ice, or too much drinking. If we can make the driving more automated by implementing different scale of safety applications and even controlling the motion of the vehicle for longer period of driving, that saves many lives and potentially billions of dollars each year, in US and other countries. We introduce here an automated vehicle infrastructure and control systems and methods. That is the category of which the current invention is under, where V2X communication technology is vital component of such system, with all the embodiments presented here and in the divisional cases, in this family.

SUMMARY OF THE INVENTION

DSRC, such as WiFi, is used here, in one embodiment. In one embodiment, DSRC V2X (vehicle to infrastructure plus vehicle) System can cover a communication circle up to 800 m, and in some cases 1000 meter, and as a result, in congested traffic areas, the onboard unit is communicating with high number of units and may end up saturating its processing capability very quickly. In one embodiment, the objective of this invention is to provide different levels of node filtering algorithms to intelligently select the node data to be processed. This will result in optimally using the available processing power by only processing the data of the desired nodes. This method is based on combination of range, velocity, heading, direction, transmitted power, received power threshold, and map database, if available.

In one embodiment, this invention also addresses methods of reducing the V2X communication congestion problem resulted in high number of one to many nodes communication. In one embodiment, the proposed methods adjust the transmission power based on some data from map database and/or based on a desired calculated communication radius of interest.

The current implementation method is based feedback mechanism that stops processing new nodes when the number of nodes exceeds some configurable threshold. Therefore, our invention here is superior to the prior art.

In one embodiment, we describe a method and system for Node adaptive filtering and congestion control in V2X system, using combined information of range, heading, velocity, map database, and node distribution.

DETAILED DESCRIPTION OF THE PREFERRED EMBODIMENTS

Figure 1:
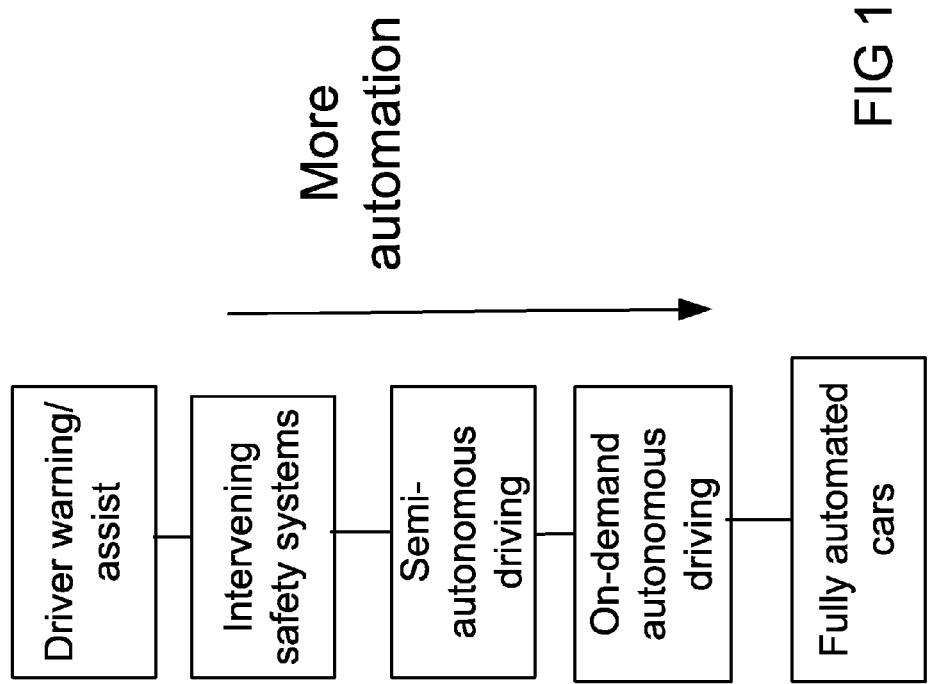
FIG. 1 is for one embodiment, as an example, for representation of development of fully automated vehicles, in stages.
Figure 2:
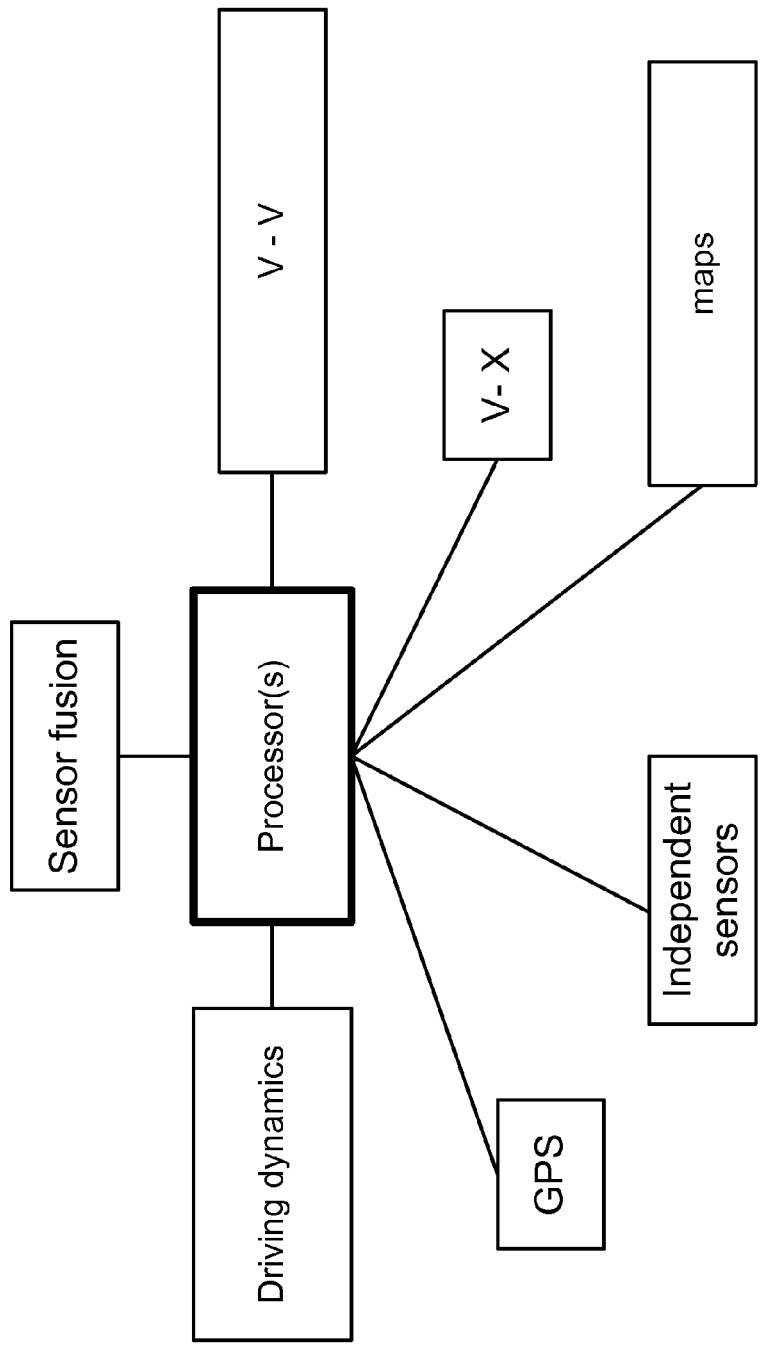
FIG. 2 is for one embodiment of the invention, for a system for automated vehicles.

FIGS. 1-9 describe in details the presented automated vehicle system. FIGS. 10-17 explain some embodiments of the current invention. FIG. 1 is for one embodiment, as an example, for representation of development of fully automated vehicles, in stages, for progression toward fully automated vehicles. FIG. 2 is for one embodiment of the invention, for a system for automated vehicles, using GPS, independent sensors, maps, driving dynamics, and sensor fusions and integrations.

Figure 3:
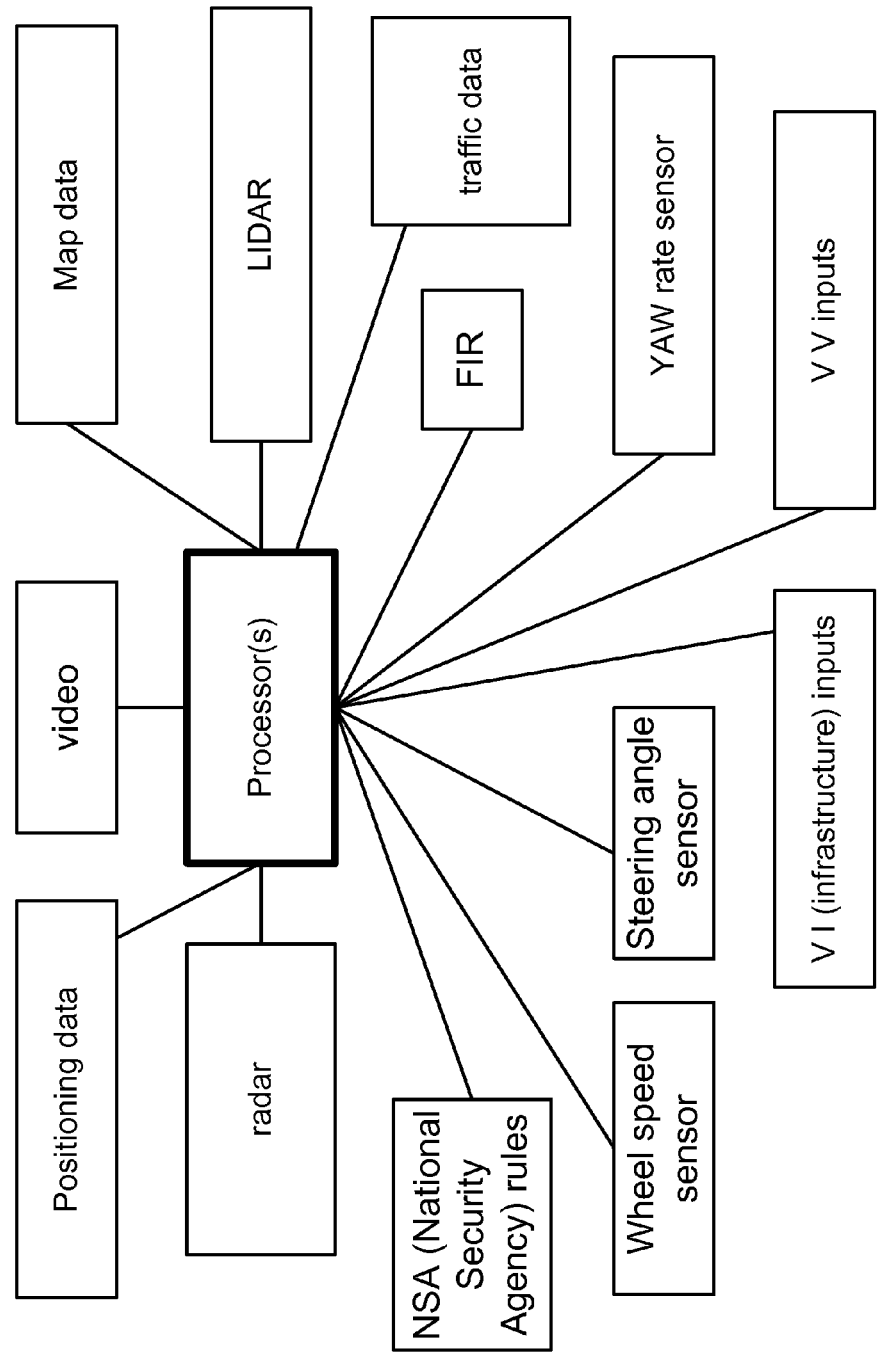
FIG. 3 is for one embodiment of the invention, for a system for automated vehicles.

FIG. 3 is for one embodiment of the invention, for a system for automated vehicles, with different measurement devices, e.g., LIDAR (using laser, scanner/optics, photodetectors/sensors, and GPS/position/navigation systems, for measuring the distances, based on travel time for light), radar, GPS, traffic data, sensors data, or video, to measure or find positions, coordinates, and distances. The government agencies may impose restrictions on security and encryption of the communications and data for modules and devices within the system, as the minimum requirements, as the hackers or terrorists may try to get into the system and control the vehicles for a destructive purpose. Thus, all of the components are based on those requirements imposed by the US or other foreign governments, to comply with the public safety.

Figure 4:
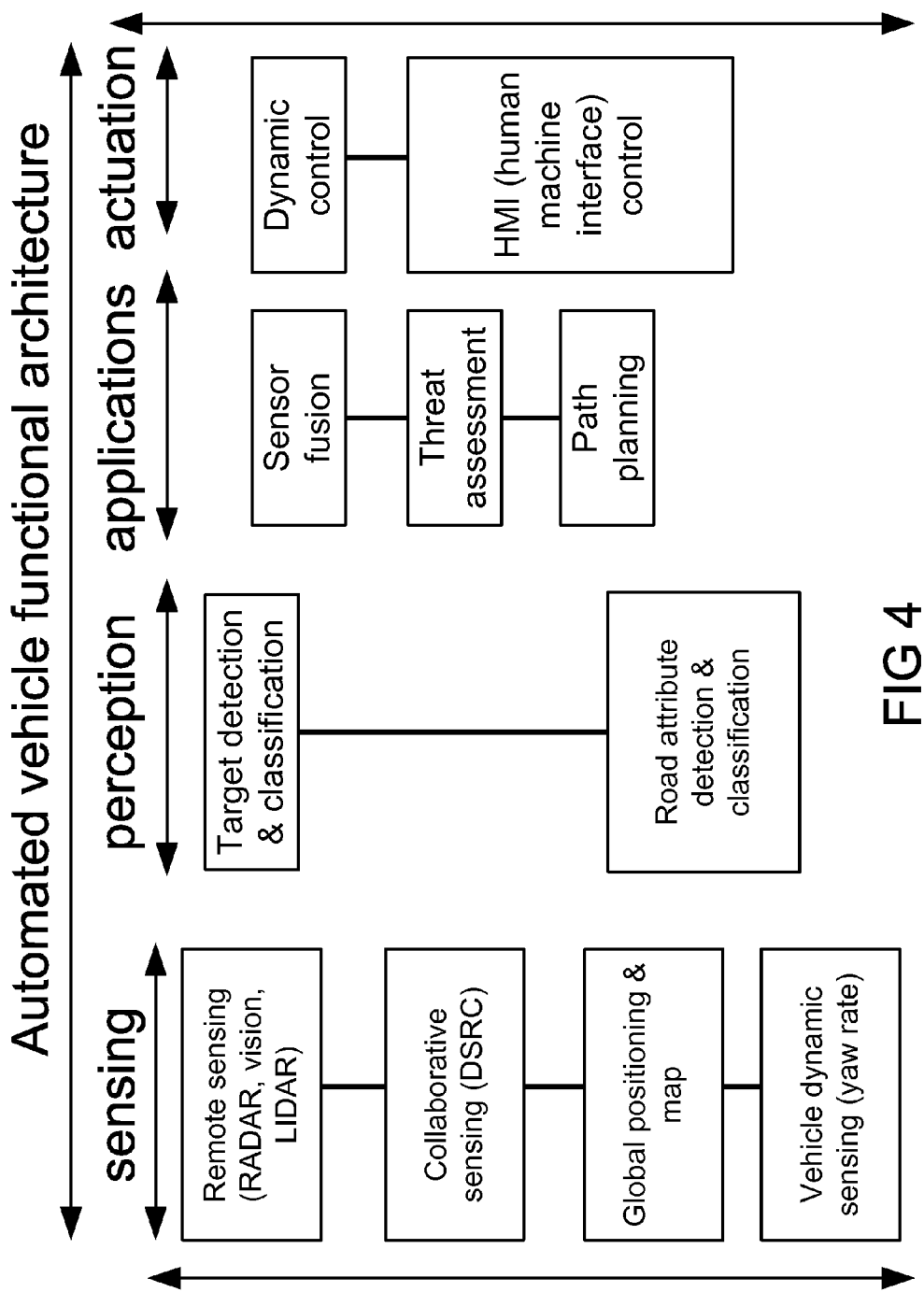
FIG. 4 is for one embodiment of the invention, for automated vehicle functional architecture.
Figure 5:
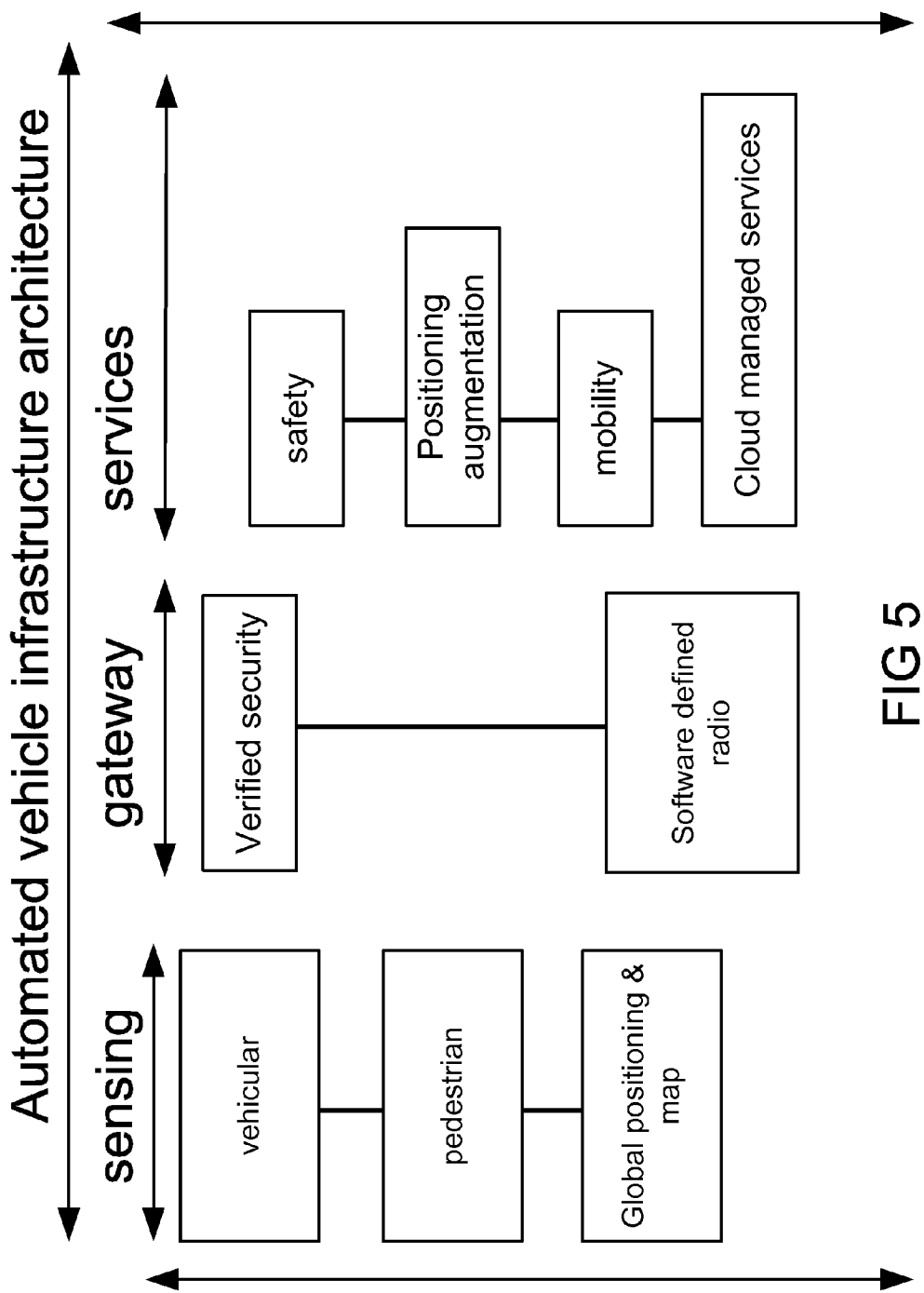
FIG. 5 is for one embodiment of the invention, for automated vehicle infrastructure architecture.

FIG. 4 is for one embodiment of the invention, for automated vehicle functional architecture, for sensing, perception, applications, and actuation. FIG. 5 is for one embodiment of the invention, for automated vehicle infrastructure architecture, for sensing, gateway, and services.

Figure 6:
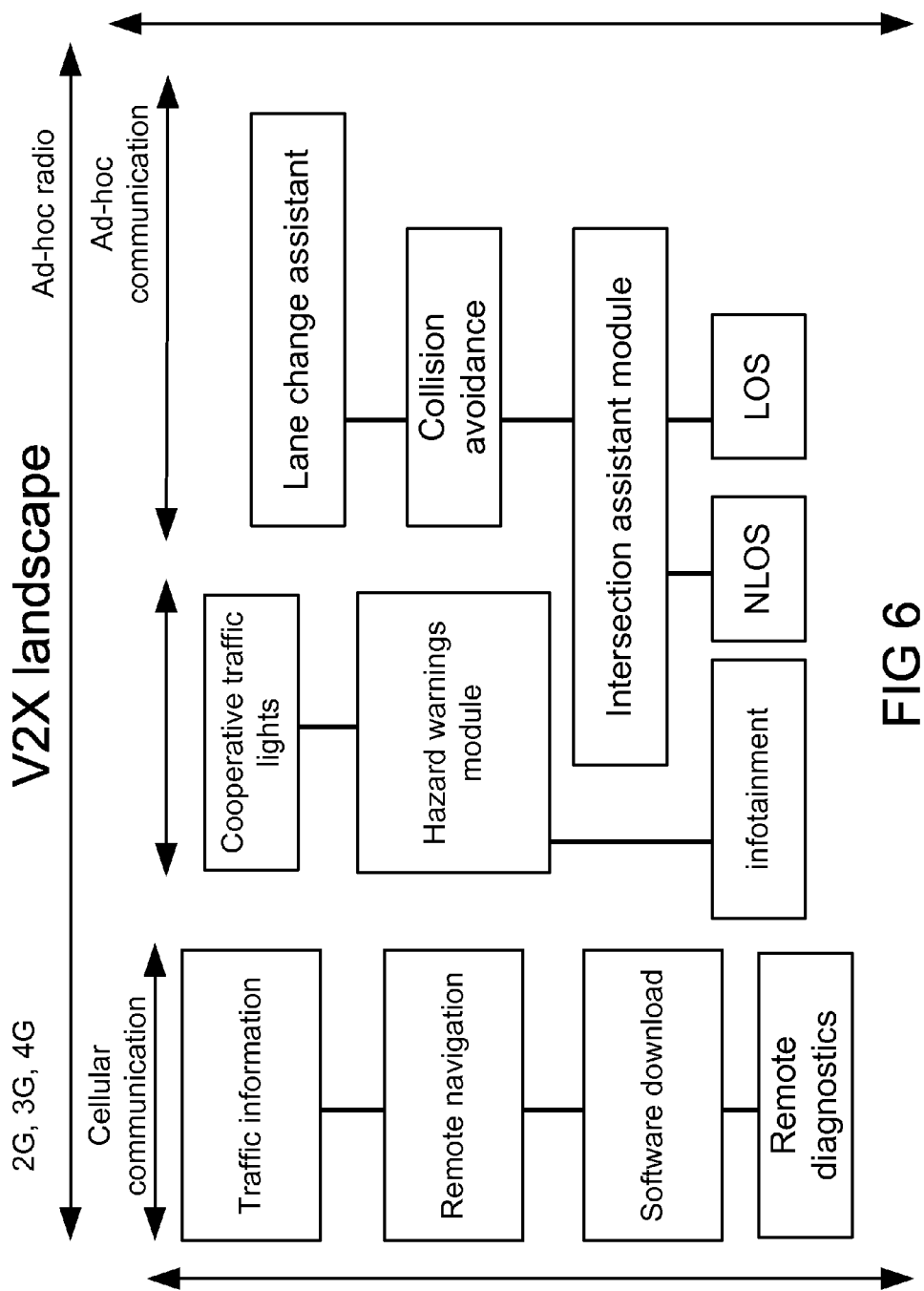
FIG. 6 is for one embodiment of the invention, for a system for V2X landscape, with components.
Figure 7:
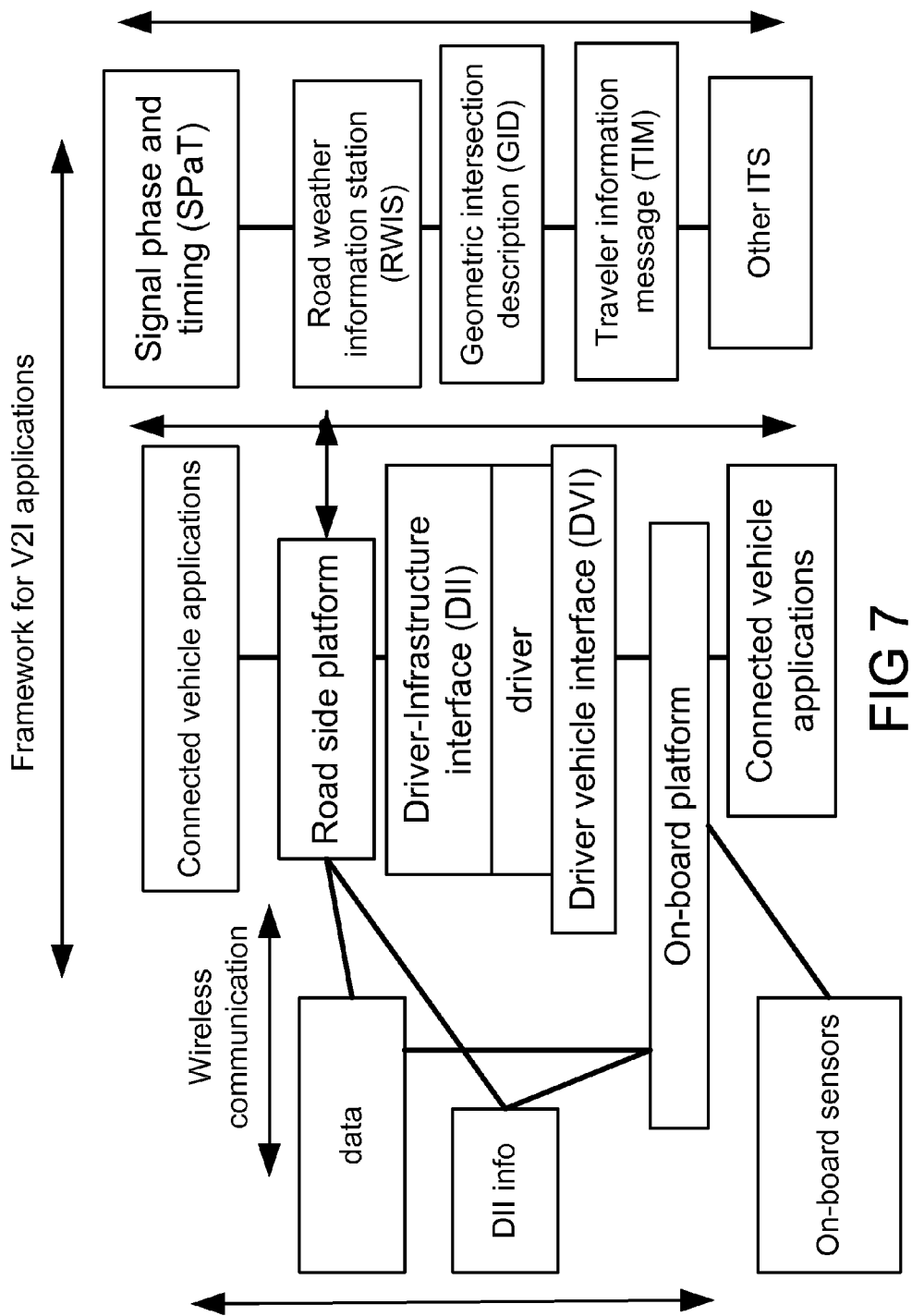
FIG. 7 is for one embodiment of the invention, for a system for framework for V2I applications, with components.

FIG. 6 is for one embodiment of the invention, for a system for V2X landscape, with components, for spectrum and range of frequencies and communications, for various technologies, for various purposes, for different ranges. FIG. 7 is for one embodiment of the invention, for a system for framework for V2I applications, with components, for road-side platform and on-board platform, using various messages and sensors.

Figure 8:
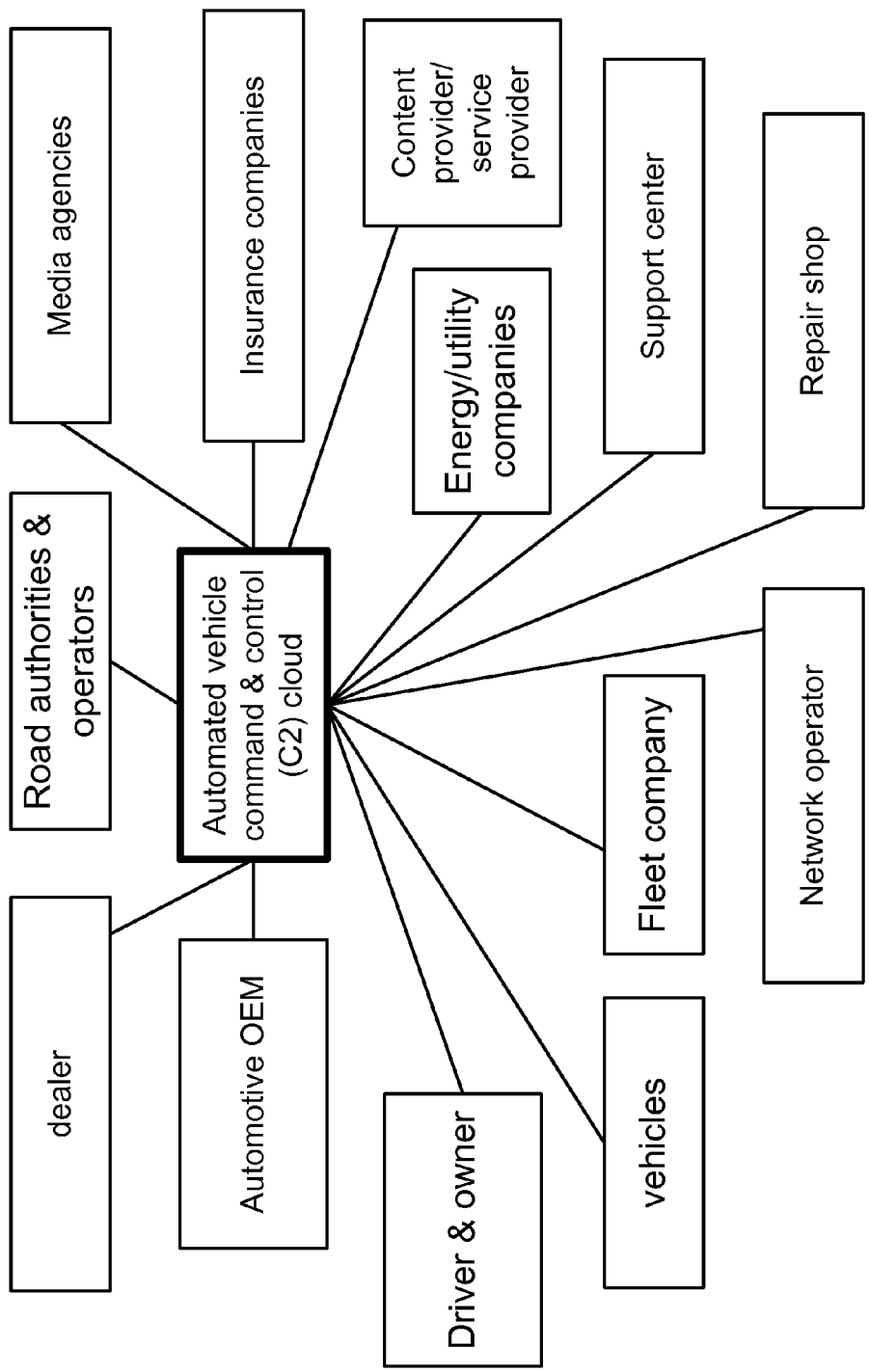
FIG. 8 is for one embodiment of the invention, for a system for automated vehicle command and control (C2) cloud, with components.
Figure 9:
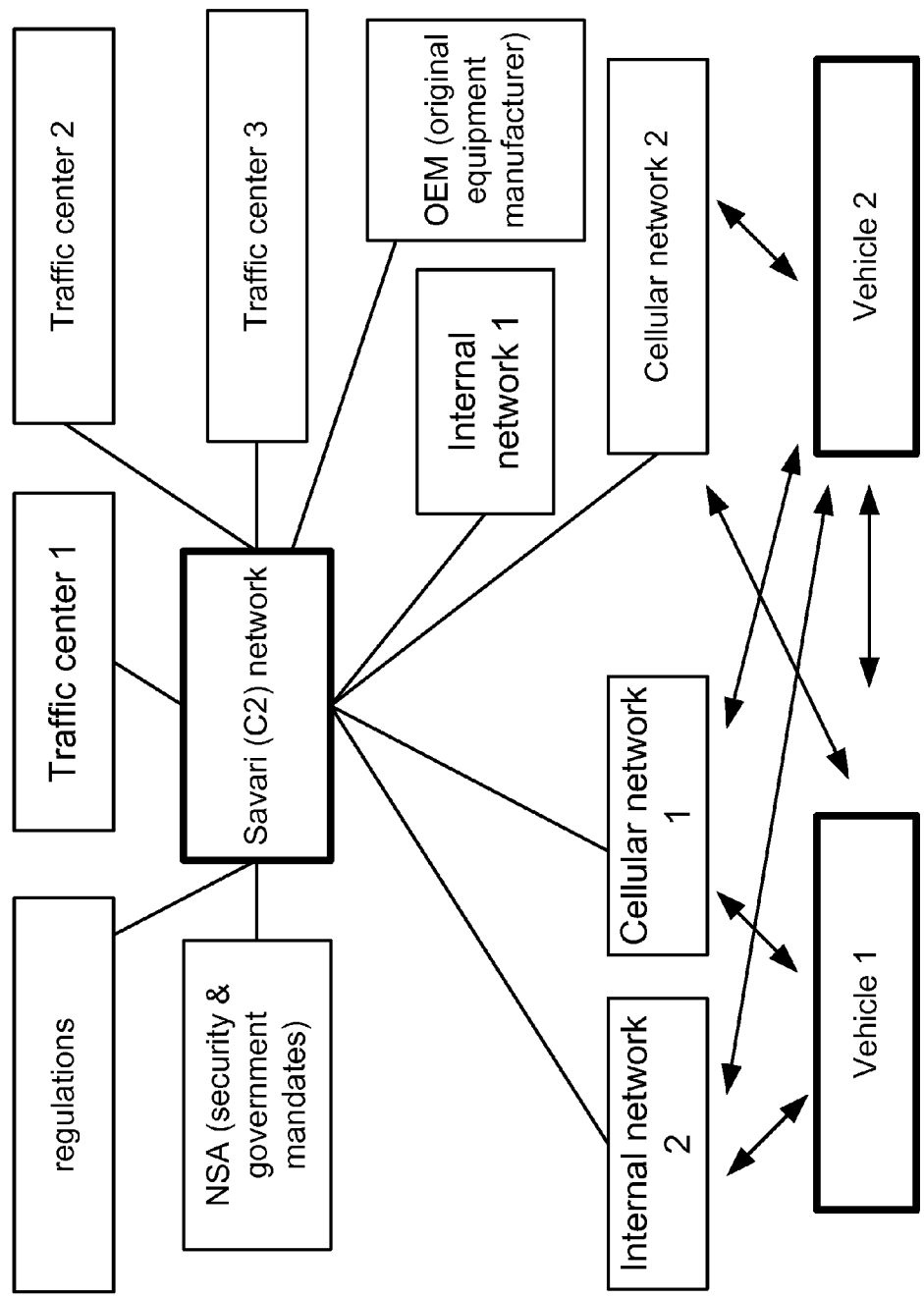
FIG. 9 is for one embodiment of the invention, for a system for our (Savari) C2 network, with components, showing communications between networks and vehicles.

FIG. 8 is for one embodiment of the invention, for a system for automated vehicle command and control (C2) cloud, with components, with various groups and people involved, as user, beneficiary, or administrator. FIG. 9 is for one embodiment of the invention, for a system for our (Savari) C2 network, with components, showing communications between networks and vehicles, using traffic centers' data and regulations by different government agencies.

In one embodiment, we have the following technical components for the system: vehicle, roadway, communications, architecture, cybersecurity, safety reliability, human factors, and operations. In one embodiment, we have the following non-technical analysis for the system: public policy, market evolution, legal/liability, consumer acceptance, cost-benefit analysis, human factors, certification, and licensing.

In one embodiment, we have the following requirements for AV (automated vehicles) system:
  Secure reliable connection to the command and control center
  Built-in fail-safe mechanisms
  Knowledge of its position and map database information (micro and macro maps)
  Communication with traffic lights/road side infrastructure
  Fast, reliable, and secure
  Situational awareness to completely understand its immediate surrounding environment
  Requires multiple sensors
  Algorithms to analyze information from sensors
  Algorithms to control the car, for drive-by-wire capability In one embodiment, we have the following primary technologies for our system:
  V2X communication: time-critical and reliable, secure, cheap, and dedicated wireless spectrum
  Car OBE (on-board equipment): sensor integration (vision, radar and ADAS (advanced driver assistance system)), positioning (accurate position, path, local map), wireless module (physical layer (PHY), Media Access Control (MAC), antenna), security (multi-layer architecture), processing and message engine, and algorithms for vehicle prediction and control In one embodiment, we have the following building blocks for AVs:
  Automation Platform
    i. Advanced Driver Assistance (ADAS) integration
    ii. Map Integration, Lane Control
    iii. Radio communications support
    iv. Vehicle Controller Unit to do actuation
  Base Station
    Ground positioning support to improve positioning accuracy
    V2I (vehicle to infrastructure) functionality, support for public/private spectrums
    Cloud connectivity to provide secure access to vehicles
  Command Control Center
    i. Integration with Infrastructure Providers Here are some of the modules, components, or objects used or monitored in our system: V2V (vehicle to vehicle), GPS (Global Positioning System), V2I (vehicle to infrastructure), HV (host vehicle), RV (remote vehicle, other vehicle, or $3^{rd}$ party), and active and passive safety controls.

Figure 10:
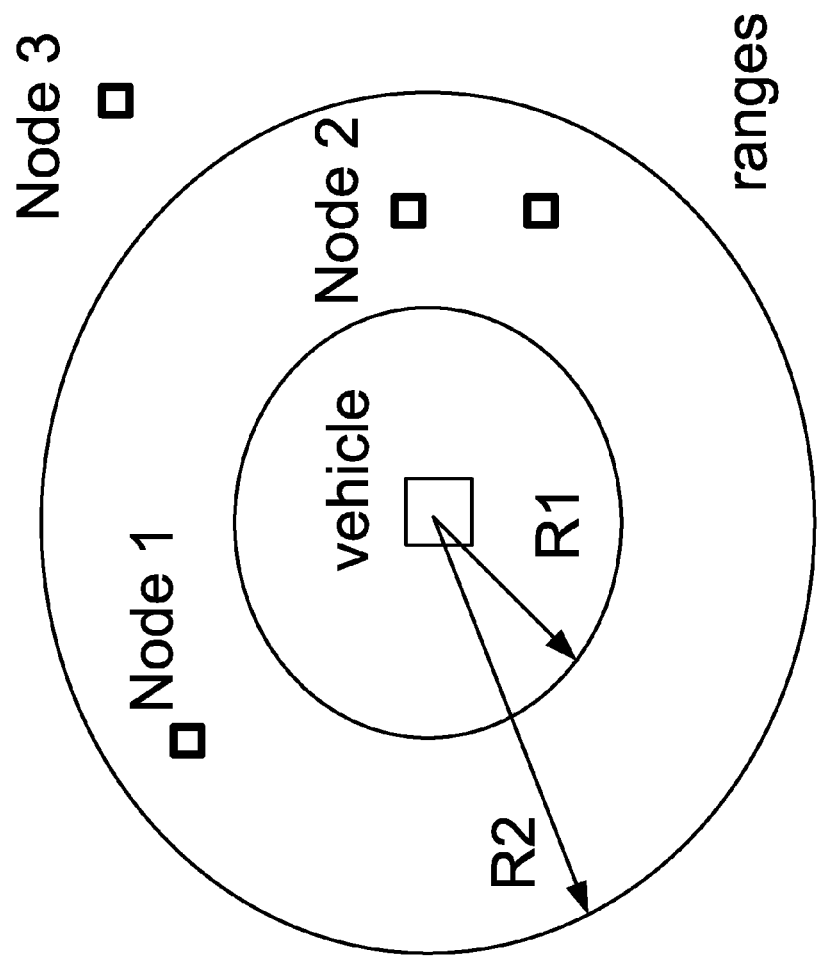
FIG. 10 is for one embodiment of the invention, for a system for host vehicle, range of R values, region(s) defined, multiple nodes or vehicles inside and outside region(s), for communications between networks and vehicles, and warning decisions or filtering purposes.
Figure 11:
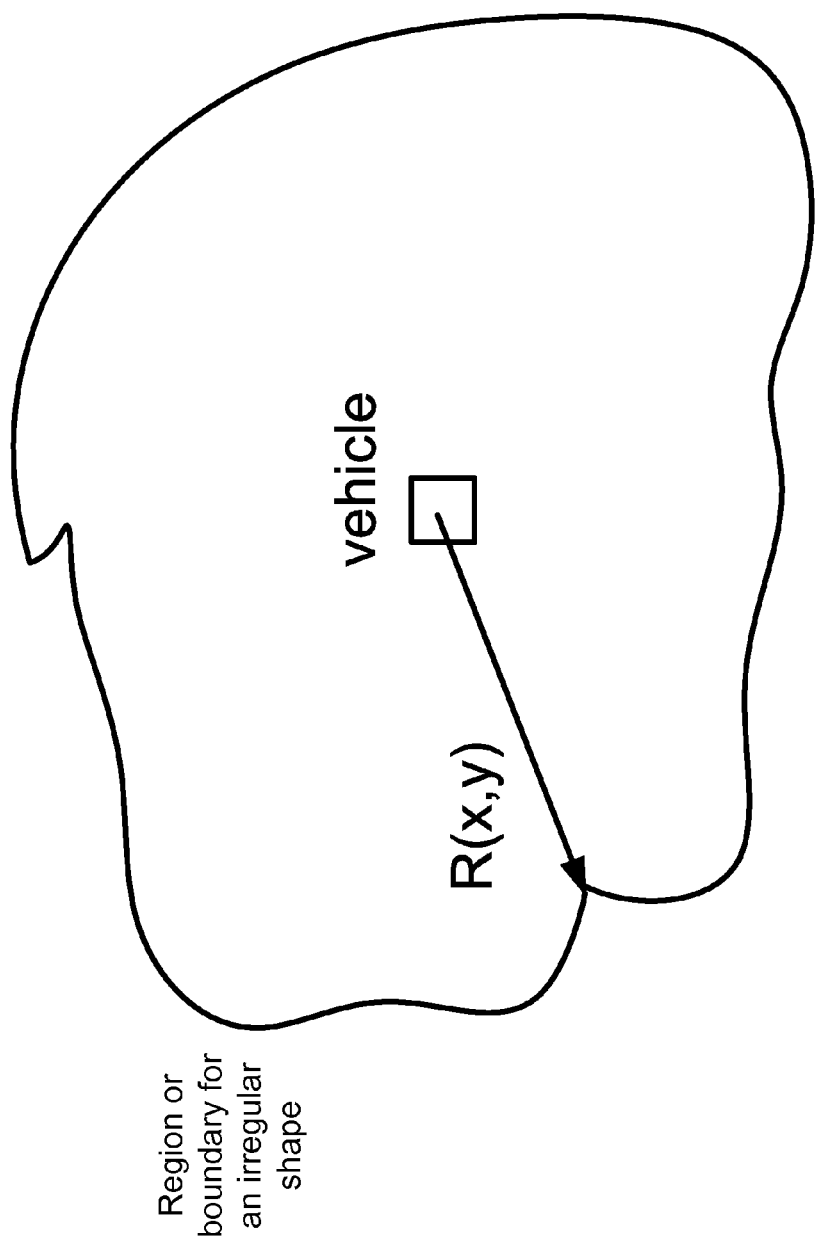
FIG. 11 is for one embodiment of the invention, for a system for host vehicle, range of R values, region(s) defined, for an irregular shape(s), depending on (x,y) coordinates in 2D (dimensional) coordinates, defining the boundaries.

FIG. 10 is for one embodiment of the invention, for a system for host vehicle, range of R values, region(s) defined, multiple nodes or vehicles inside and outside region(s), for communications between networks and vehicles, and warning decisions or filtering purposes, for various filters to reduce computations and reduce the bandwidth needed to handle the message traffic. FIG. 11 is for one embodiment of the invention, for a system for host vehicle, range of R values, region(s) defined, for an irregular shape(s), depending on (x,y) coordinates in 2D (dimensional) coordinates, defining the boundaries, or in 3D for crossing highways in different heights, if connecting.

Figure 12:
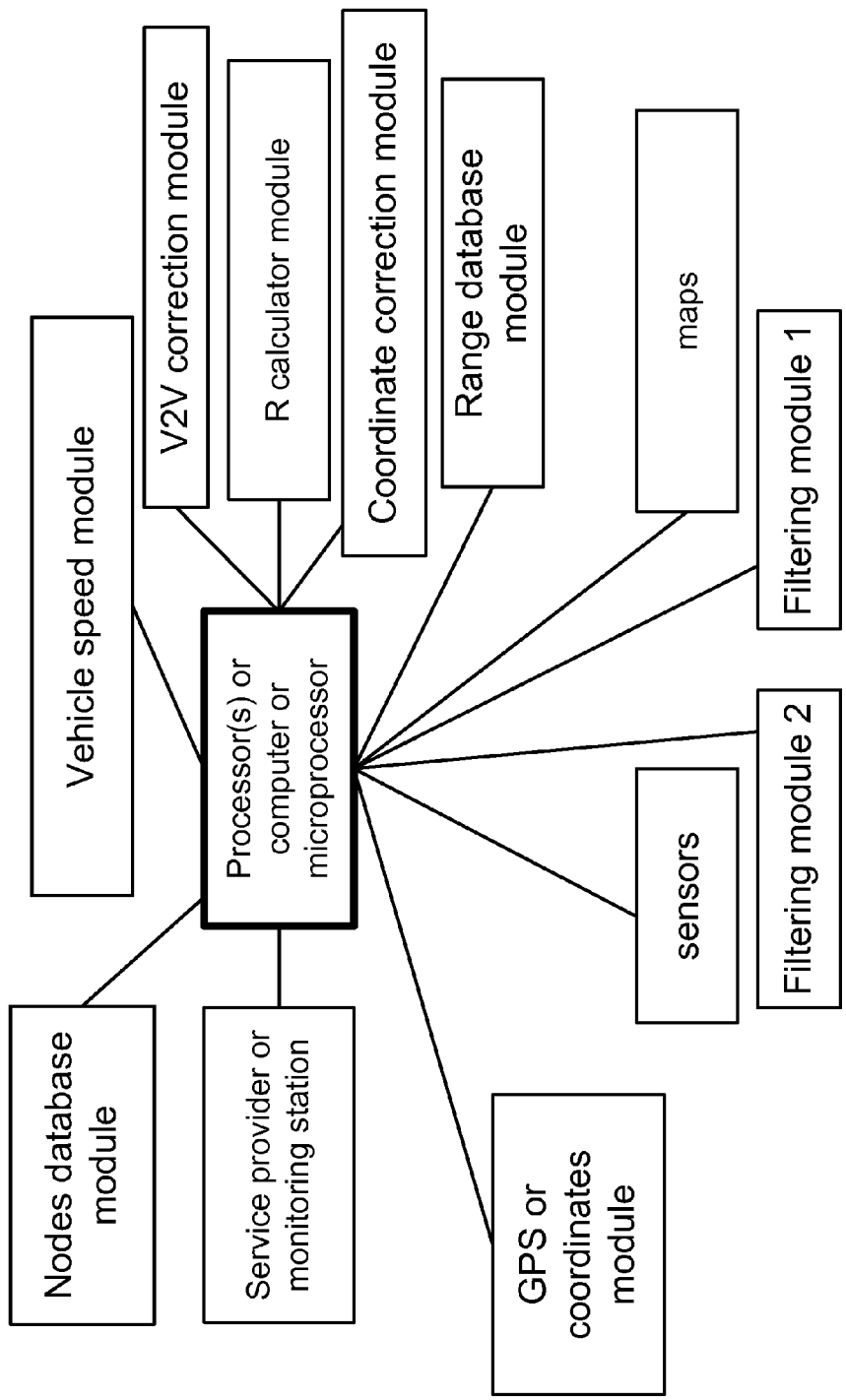
FIG. 12 is for one embodiment of the invention, for a system for automated vehicles, with components, with one or more filtering modules.
Figure 13:
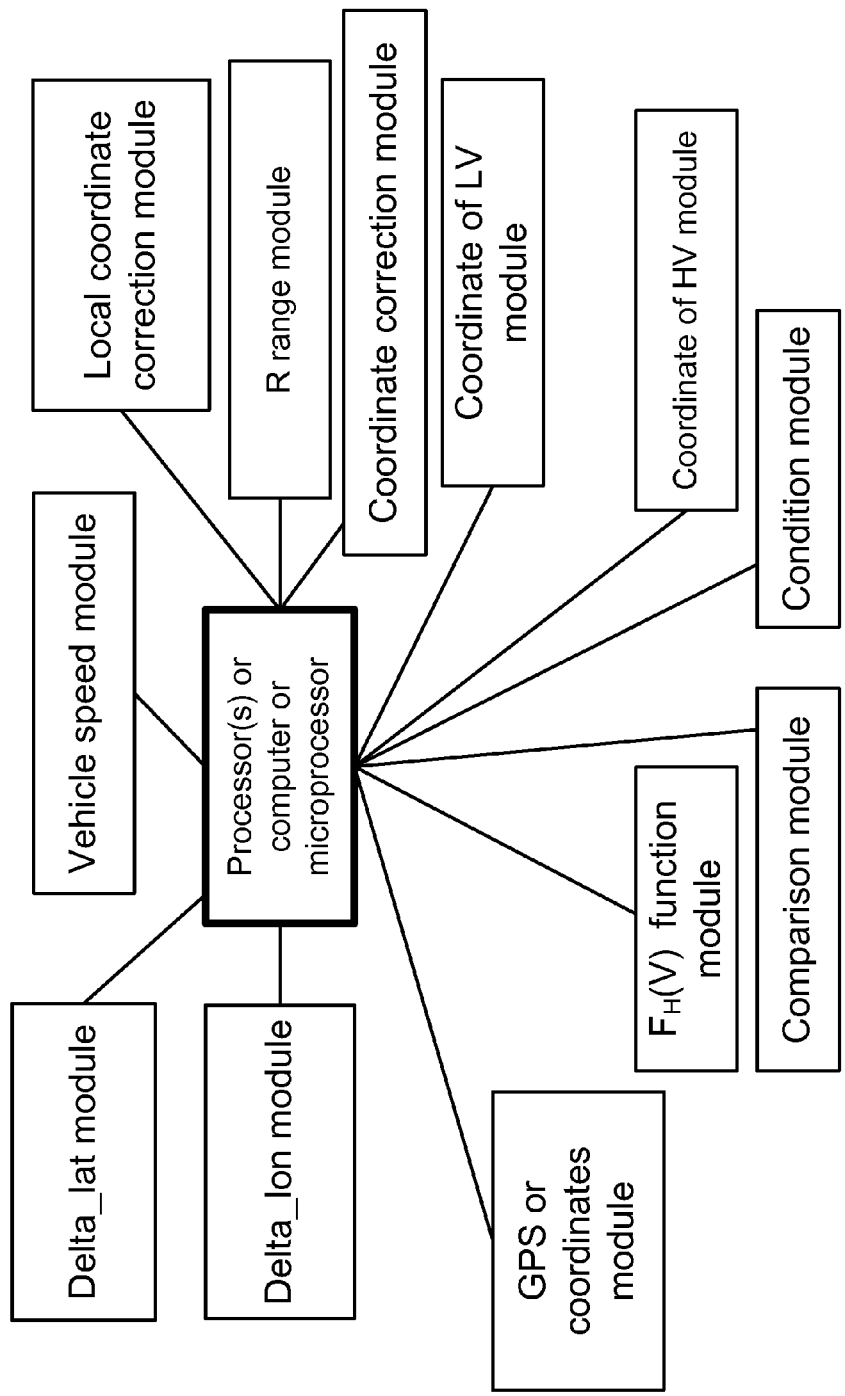
FIG. 13 is for one embodiment of the invention, for a system for automated vehicles, with components, with a function F( ), e.g., depending on the velocity of the vehicle, for calculations for Lat and Lon coordinates, and their corresponding deltas or differences.

FIG. 12 is for one embodiment of the invention, for a system for automated vehicles, with components, with one or more filtering modules, based on coordinates, Rs, GPS, and maps, and their corresponding corrections. FIG. 13 is for one embodiment of the invention, for a system for automated vehicles, with components, with a function F( ), e.g., depending on the velocity of the vehicle, for calculations for Lat and Lon coordinates, and their corresponding deltas or differences, with local and global coordinate correction module(s).

Figure 14:
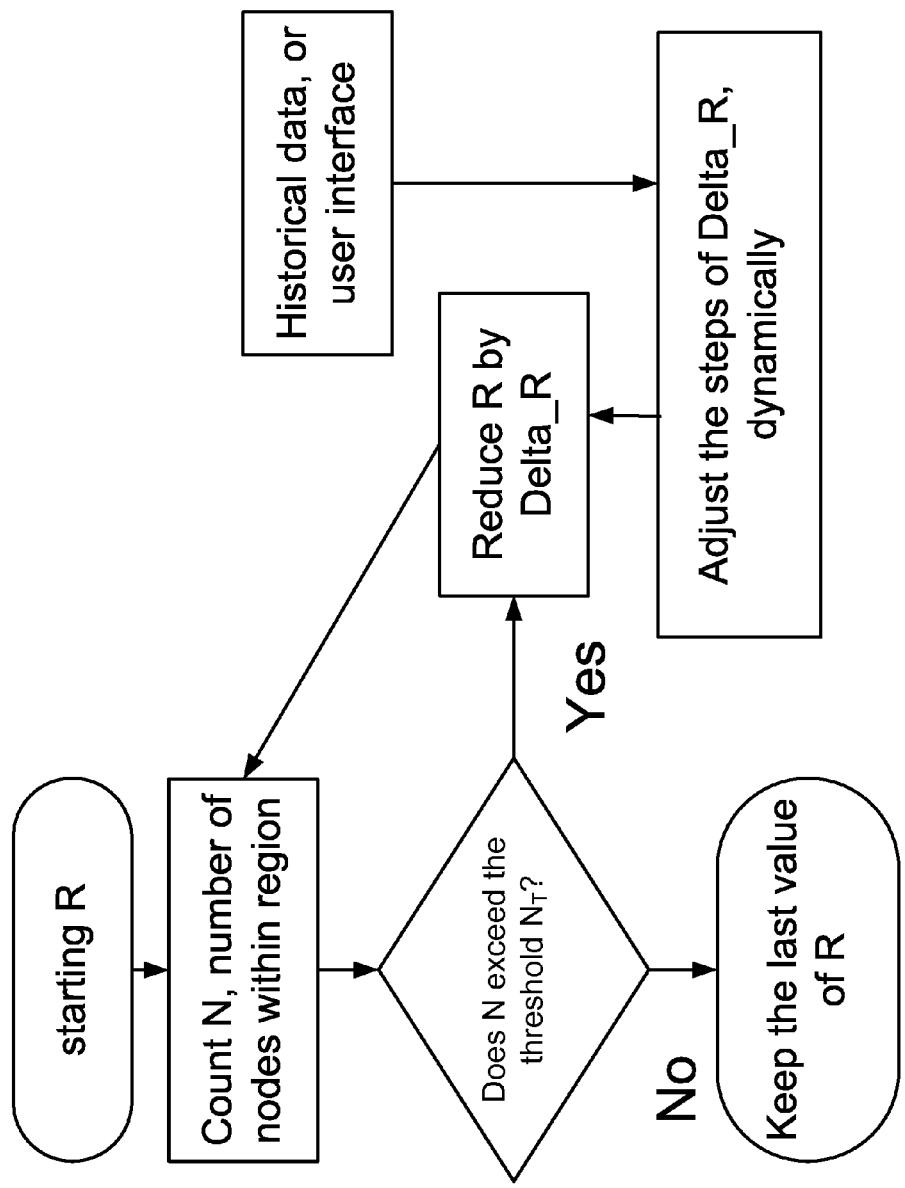
FIG. 14 is for one embodiment of the invention, for a method for automated vehicles, for adjusting R dynamically, based on rules engine, historical data, user-interface, or neural network.
Figure 15:
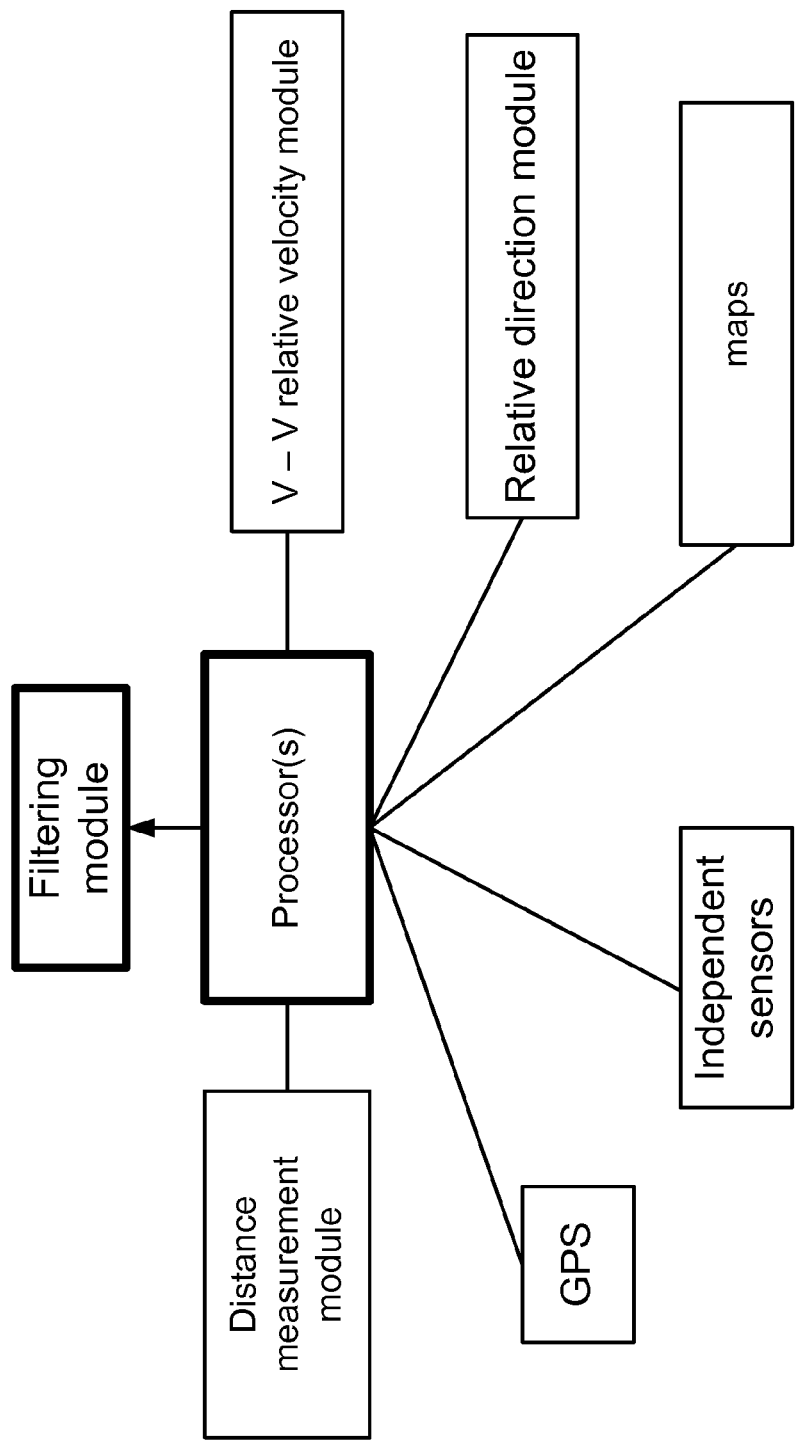
FIG. 15 is for one embodiment of the invention, for a system for automated vehicles, for filtering module, for direction, velocity, and distance.

FIG. 14 is for one embodiment of the invention, for a method for automated vehicles, for adjusting R dynamically, based on rules engine, historical data, user-interface, or neural network, e.g., for filtering purpose. FIG. 15 is for one embodiment of the invention, for a system for automated vehicles, for filtering module, for direction, velocity, and distance, e.g., using independent sensors and GPS.

Figure 16:
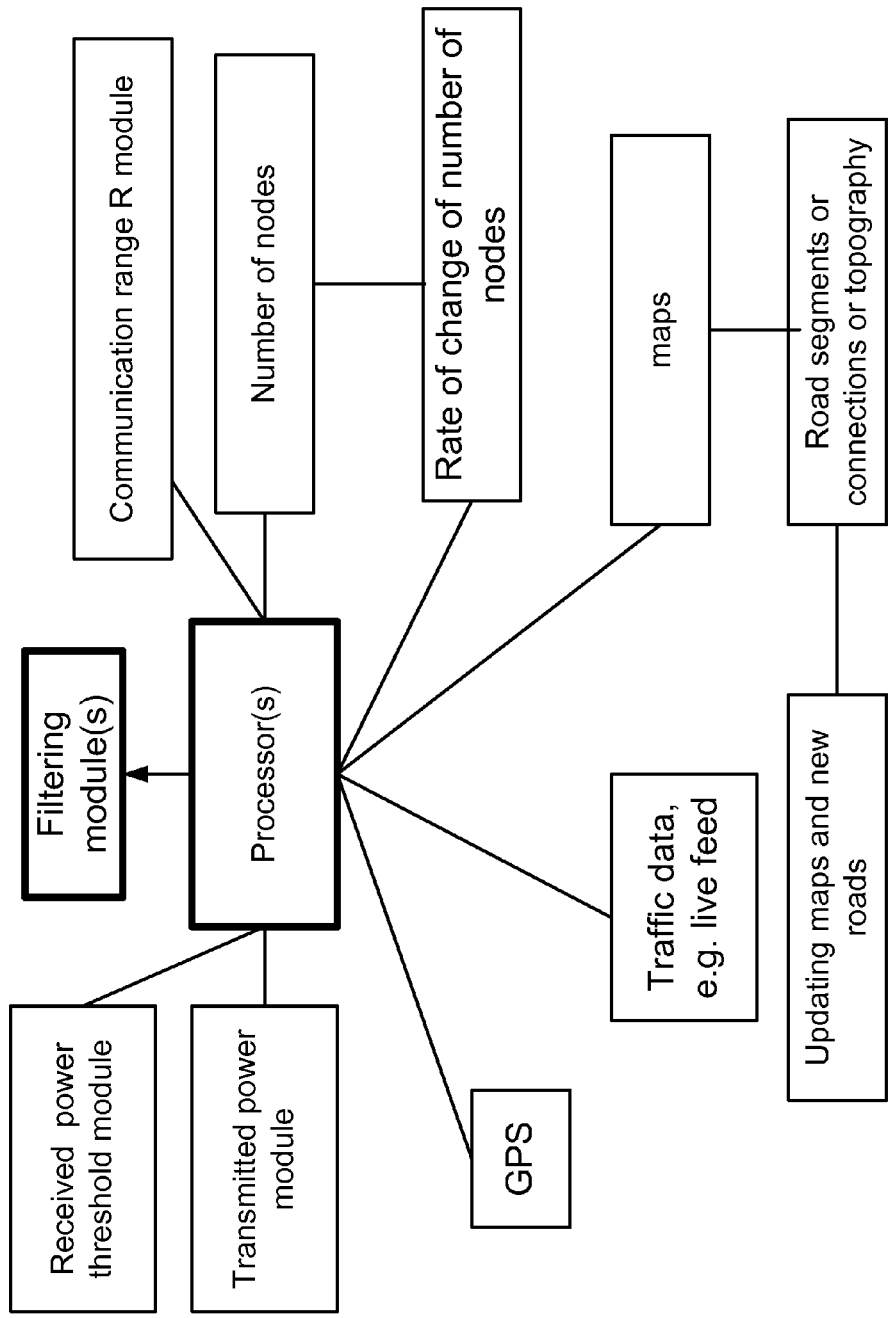
FIG. 16 is for one embodiment of the invention, for a system for automated vehicles, for filtering module, for power, power threshold(s), traffic data, maps, topography, R, number of nodes, and rate of change of number of nodes.

FIG. 16 is for one embodiment of the invention, for a system for automated vehicles, for filtering module, for power, power threshold(s), traffic data, maps, topography, R, number of nodes, and rate of change of number of nodes, with a module for updating the new roads, intersections, and topographies, by user or automatically, as a feed, e.g. periodically or based on an event.

Figure 17:
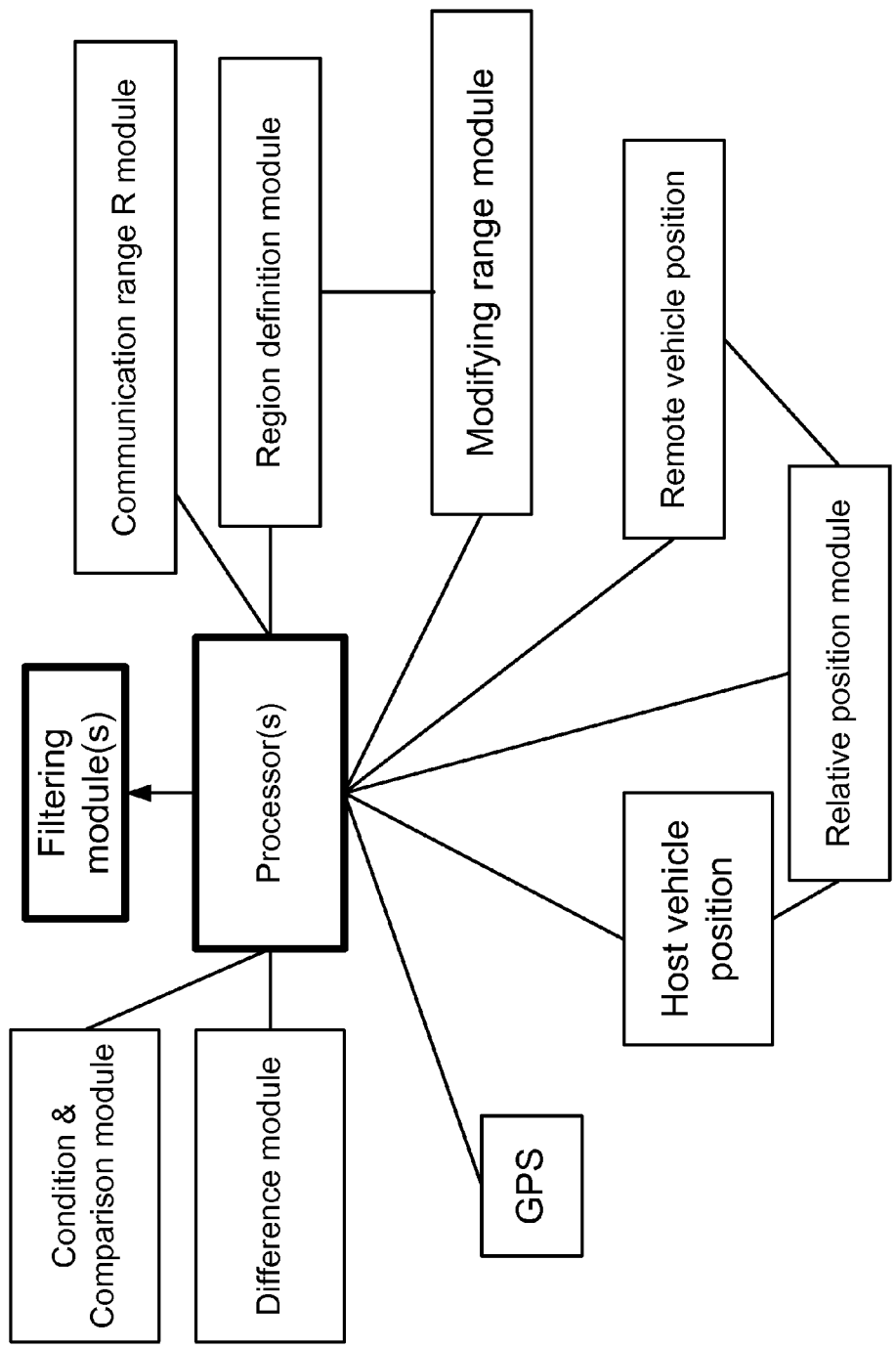
FIG. 17 is for one embodiment of the invention, for a system for automated vehicles, for filtering module, for various vehicles.

FIG. 17 is for one embodiment of the invention, for a system for automated vehicles, for filtering module, for modifying region, for various vehicles, with relative position module and GPS, with condition module, to compare and get all the relevant nodes or vehicles.

Here, we describe a method, as one embodiment: The first level of filtering is based on defining circle (geometry) of interest or any other geometrical shape (see also FIG. 11). For the circular geometry case, the objective is to ignore (not process) all nodes (vehicles) that is outside a calculated radius R (see also FIG. 10). In one embodiment, the R is calculated based on the targeted safety applications combined with vehicle dynamics. For example, FCW (forward collision warning), BSW (blind spot warning), LCA (lane change assist), IMA (intersection movement assist), and CSW can all be implemented using 200 m (meter) radius. In one embodiment, as the vehicle speed decreases, the forward application required coverage range decreases.

In one embodiment, for example, for calculating R, we have (see also FIG. 13):

R, as a function of host vehicle speed, $F_H$, e.g.:

$$R = F_H(V) = 50 + 2V + (V^2/8)$$

Where V is the host vehicle speed in m/s.

In one embodiment, F is a function of velocities, distances, and coordinates, both in absolute values and relative values, for host and other vehicles. In one embodiment, F is a function of polynomial of degree G, in host vehicle speed V. In the example above, we have: G=2.

For example, for: 70 m≤R≤200 m

That is, Maximum (R)=200 m, and

Minimum (R)=70 m.

The 70 meter will still be sufficient to do all the rear applications. These numbers are just examples for some specific applications.

In one embodiment, the next step is to convert this R to delta Longitudinal and delta Latitude from the host vehicle coordinate. The objective here is to ignore all vehicles that are outside a radius. Here, we assumed circular filtering. Different types of geometric filtering can also be done: rectangle, ellipse, other irregular geometry, or any other regions or shapes. For circular filtering, given the current host vehicle (HV) coordinate (lat_HV, lon_HV), and given the desired filtering radius R, then the equivalent delta latitude (Delta_lat) and delta longitudinal (Delta_lon), from (lat_HV, lon_HV) for this radius R, are calculated as follows (see also FIG. 13):

$$Delta\_lat = (R/Radius\_of\_earth) = (R/6378137),$$

e.g., based on Earth Equatorial radius of 6378137 m, and where R is in meter (m).

$$Delta\_lon = \arcsin(\sin(Delta\_lat)/\cos(lat\_HV))$$

Therefore, in one embodiment, to apply the filtering algorithm for any node (Remote Vehicle (RV)), with the coordinate of (lat_RV, lon_RV), the following is executed (see also FIG. 13, for Comparison Module and Condition Module):

If $$Abs(lat\_RV - lat\_HV) > Delta\_lat$$

OR $$Abs(lon\_RV - lon\_HV) > Delta\_lon$$

Then: Ignore it (i.e., do not process it).

Else: Process it.

Wherein all "lat" and "lon" values are expressed in radian. The default value for R is 200 m, but it is configurable. For jam reduction and reduction of processing, in one embodiment, we want to ignore all the vehicles outside of the radius R.

Now, in one embodiment, this value of R can be adaptively adjusted based on the statistical distribution of the nodes ranges (see also FIG. 12). For example, if the maximum number of nodes that can be processed is 150, and the calculated R=200 m, and the number of nodes in the 200 m radius is 200 nodes, but most of those nodes are close to the 200 m range, then the R value can be adaptively adjusted (reduced), so we get close to the 150 desired total numbers of nodes. For example, this can be done in small steps with ΔR, in a loop, reducing the value of R slightly, each time (in each step), and measuring the nodes or vehicles within the new radius, and the process continues, until we get 150 nodes or less in that radius, and then we exit the loop, and stop the process (see also FIG. 14). Then, we select the final radius as the radius for the formulation and next steps.

In one embodiment, the second level of filtering is based on the relative velocity between the host vehicle and the remote vehicle. For example, for all remote vehicles that have a value of the velocity component in host vehicle direction that is greater than the host vehicle velocity, and they are also at relatively high range distance from the host vehicle, then they constitute no immediate threat on the host vehicle (based on the probability) (see also FIG. 15). Thus, those vehicles can be filtered out.

In one embodiment, the third level of filtering is to adjust either the transmitted power and/or the received power threshold as a function of one of the following (as different embodiments) (see also FIG. 16):

a. Rate of change in the number of received nodes. As the number of nodes increases sharply, the host vehicle is approaching a congested traffic area, and therefore, the transmitted power can be decreased to reduce the communication range, and/or the received power threshold can be increased to reduce the receiving communication range (see also FIG. 16).

b. The map database can also be used very effectively: For example, if the number of connected road segments to the host vehicle road segment is high, and/or the total number of road segments is high within a defined area, then the transmitted power can be decreased, and/or the received power threshold can be increased (see also FIG. 16).

c. Based on the calculated R. For example, communication range R decreases/increases, as the transmission power increases/decreases (see also FIG. 16).

In one embodiment, the fourth level of filtering is just using the map database: For example, filter all the nodes (vehicles) that are on road segments that are not connected to the host vehicle road segment. An example for that is the main road and an overpass geometry. The main road and the overpass that passes over it are not connected, and thus, they do not make a V2V (vehicle to vehicle) possible traffic hazard. Map database can provide this information that these two road segments are not connected (see also FIG. 16).

The advantages of our methods are very clear over what the current state-of-the-art is. Our methods optimally use the available processing power and available bandwidth on processing the data of the desired nodes, which are relevant or important. They also help reducing the communication congestion problem.

Please note that the attached Appendix is also a part of our teaching here, with some of the technologies mentioned there developed fully within our company, and some with prototypes, for which we seek patent protection in this and future/co-pending divisionals or related cases or continuations.

In this disclosure, any computing device, such as processor, microprocessor(s), computer, PC, pad, laptop, server, server farm, multi-cores, telephone, mobile device, smart glass, smart phone, computing system, tablet, or PDA can be used. The communication can be done by or using sound, laser, optical, magnetic, electromagnetic, wireless, wired, antenna, pulsed, encrypted, encoded, or combination of the above. The vehicles can be car, sedan, truck, bus, pickup truck, SUV, tractor, agricultural machinery, entertainment vehicles, motorcycle, bike, bicycle, hybrid, or the like. The roads can be one-lane county road, divided highway, boulevard, multi-lane road, one-way road, two-way road, or city street. Any variations of the above teachings are also intended to be covered by this patent application.

The invention claimed is:

1. A method for node adaptive filtering and congestion control for automated vehicles in highways, said method comprising:
    a region boundary module defining a dynamic region of interest for a host vehicle,
    wherein said dynamic region of interest has a range,
    wherein said range is a function of absolute or relative position and absolute or relative velocity of said host vehicle and a remote vehicle;
    a position determination device indicating a latitude coordinate and a longitudinal coordinate for said host vehicle;
    said position determination device indicating a latitude coordinate and a longitudinal coordinate for said remote vehicle;
    a processor calculating a delta latitude value based on said range;
    said processor calculating a delta longitudinal value based on said delta latitude value and said host vehicle's latitude coordinate;
    said processor calculating a first difference, wherein said first difference is absolute value of difference between said host vehicle's latitude coordinate and said remote vehicle's latitude coordinate;
    said processor calculating a second difference, wherein said second difference is absolute value of difference between said host vehicle's longitudinal coordinate and said remote vehicle's longitudinal coordinate;
    a comparison module comparing said first difference with said delta latitude value; and
    said comparison module comparing said second difference with said delta longitudinal value.

2. The method as recited in claim 1, wherein if said first difference is larger than said delta latitude value, or said second difference is larger than said delta longitudinal value, then said processor does not process data.

3. The method as recited in claim 1, wherein said range is a function of said host vehicle's absolute velocity value.

4. The method as recited in claim 1, wherein said range is a polynomial function of said host vehicle's absolute velocity value.

5. The method as recited in claim 1, wherein said range is a polynomial function of said host vehicle's absolute velocity value, with degree 2.

6. The method as recited in claim 1, wherein said range is adaptively adjusted based on statistical distribution of said remote vehicle distances from said host vehicle.

7. The method as recited in claim 1, wherein said range is adaptively adjusted based on number of vehicles within said range.

8. The method as recited in claim 1, wherein said range is reduced based on number of vehicles within said range.

9. The method as recited in claim 1, wherein said range is reduced in multiple steps.

10. The method as recited in claim 1, said method comprising:
    filtering vehicles based on relative velocities and positions, with respect to said host vehicle.

11. The method as recited in claim 1, said method comprising:
    adjusting a transmitted power.

12. The method as recited in claim 1, said method comprising:
    adjusting a receiving power threshold.

13. The method as recited in claim 1, said method comprising:
    using a map database.

14. The method as recited in claim 1, said method comprising:
    using a topography diagram.

15. The method as recited in claim 1, said method comprising:
    using a traffic data.

16. The method as recited in claim 1, said method comprising:
    using a feed data transmission.

17. The method as recited in claim 1, said method comprising:
    using a number of vehicles within said range.

18. The method as recited in claim 1, said method comprising:
    using a rate of change of number of vehicles within said range.

19. The method as recited in claim 1, wherein said range is a circle.

20. The method as recited in claim 1, wherein said range is a sphere.

21. The method as recited in claim 1, said method comprising:
    using heading or direction information as a filtering mechanism or criteria.

* * * * *